Sept. 11, 1956 G. E. HEBERLEIN Re. 24,216

DISCONNECT SWITCH

Original Filed June 20, 1951 2 Sheets-Sheet 1

INVENTOR.
GUSTAVE E. HEBERLEIN

BY Ostrolenk & Faber

ATTORNEYS

DISCONNECT SWITCH

Original Filed June 20, 1951 2 Sheets-Sheet 2

INVENTOR.
GUSTAVE E. HEBERLEIN

BY Ostrolenk & Faber

ATTORNEYS

United States Patent Office

Re. 24,216
Reissued Sept. 11, 1956

24,216

DISCONNECT SWITCH

Gustave E. Heberlein, Bryn Mawr, Pa., assignor, by mesne assignments to I-T-E Circuit Breaker Company, Philadelphia, Pa., a corporation of Pennsylvania Original No. 2,673,903, dated March 30, 1954, Serial No. 232,497, June 20, 1951. Application for reissue July 2, 1956, Serial No. 595,809.

12 Claims. (Cl. 200—48)

Matter enclosed in heavy brackets [ ] appears in the original patent but forms no part of this reissue specification; matter printed in italics indicates the additions made by reissue.

My present invention relates to disconnect switches. More particularly it relates to the current carrying connection between elements of the blade assembly of disconnect switches of the type shown in patent application Serial No. 145,389, of which this is a continuation in part application.

This switch has an angularly movable contact arm rotatably mounted on a base or terminal. This contact arm includes a blade which rotates around its longitudinal axis into high pressure engagement with stationary contacts. To permit this rotation, while maintaining a good current path between the rotating blade and the angularly movable portion thereof, a current carrying connection comprising threadedly engaged contact elements is used. This connection is of the type generally disclosed in application Serial No. 145,389, the present invention being a modification of that shown in the said application.

The primary object of my invention is, therefore, to provide a current carrying connection between the rotatable blade and the angularly movable member on which it is mounted, the current carrying connection serving also as a means for mounting the blade.

Another object of my invention is the provision of a novel weatherproof efficient current carrying connection between the blade portion of the contact arm and the hinge casting of the disconnect switch.

A further object of my invention is the arrangement and combination of parts and elements and the simplification of operation to the end that a minimum number of parts are required to construct the hinge and blade assembly of disconnect switches.

Another object of my invention is the provision of spring loaded contacts at the connection between the angularly movable hinge casting and the rotatable blade itself so arranged that the contacts are always in engagement, thereby simplifying the provision of means for excluding foreign matter from the contacts and thereby preventing corrosion.

A further object of my invention is the provision of a garter spring to maintain the contact surfaces of the hinge casting and of the suitable blade into high pressure engagement.

These and many other objects of the invention will become apparent in the following description and drawings in which:

Figure 5b is a cross-sectional view of a modification of the conducting joint of Figure 5a.

Figure 1:
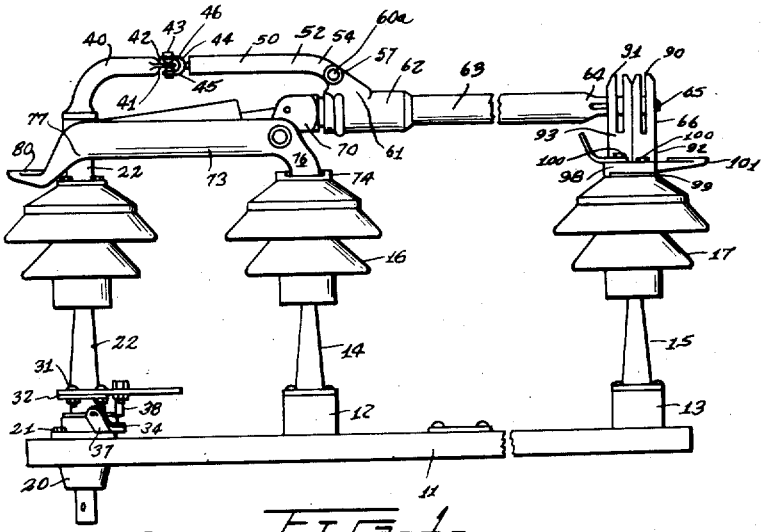
Figure 1 is a cross-sectional view of the disconnect switch incorporating this invention.

Referring now to Figure 1, I have here shown a disconnect of the type disclosed in application Serial No. 145,389 filed February 21, 1950 in which the disconnect switch is mounted on the base 11 which is a suitable longitudinal structural support, in this case shown horizontally arranged for a horizontally or upright mounted disconnect switch.

The base 11 has secured thereto in any suitable manner as by the insulator spacers 12 and 13 the stationary upright supporting posts 14, 15 on the upper portions of which are mounted insulators 16, 17.

Base 11 is also provided with the bearing 20 appropriately secured thereto in any suitable manner as by the bolts 21 and carrying the rotatable vertical shaft 22 to the upper end of which is keyed the insulator 23 for rotation with the vertical shaft or post 22.

Below insulator 23 there is keyed to the shaft 22 the crank 30 secured thereto in any suitable manner as by the bolts 31 connected to the flange or crank plate 32. Bolts 21 which secure the bearing 20 in position also secure the stop plate 34 in position, the stop plate being provided at opposite ends with the adjustable stops 36, 37 which engage at either end with the stop 38 on the operating crank 30.

While stops 36, 37 are herein provided, the construction and operation of my novel switch are such that it may operate properly without the stops at individual poles; in such case, the stops would be provided at the operating means for the entire switch.

Where stops are eliminated at all points, then the switch may be operated by crank 30 to close and then open by a single continuous movement in one direction to establish a contact momentarily and then break it.

Shaft 22a extends above the insulator 23 as effectively a continuation of vertical shaft 22, being, however, spaced therefrom by insulator 23. Crank 40 at the upper end of shaft 22a is preferably integral therewith and, therefore, rotates therewith.

Crank 40 extends horizontally or at least parallel with the base supporting structure 11 and rotates in the horizontal plane. Crank 40 is shown herein as tubular although it may have any desired cross-section consistent with the mechanical loads imposed thereon. The outer end of crank 40 is flattened at 41 and is provided with a circular opening 42 through which pin 43 may pass.

A clevis member 44 receives extension 41, connection being made by pin 42.

Clevis 44 is integral with the threaded extension 50 which enters into the tapped opening 51 in the forked link 52. The threaded extension 50 is so arranged that as the threaded extension 50 rotates with respect to the forked link 52 and its tapped opening 51, it has linear movement with respect thereto.

Forked link 52 has a pair of arms 54 at the ends opposite the tapped opening 51 which are secured to the blade crank 61 of sleeve casting 62 by pin 60a.

The blade support sleeve casting 62 carries the tubular switch blade 63 secured therein and rotatable therewith.

The outer end of the tubular switch blade is flattened at 64 (Figure 1) and is provided with appropriate contacts 65 engageable with the stationary contact jaws 66.

The blade support sleeve casting 62 is mounted for rotation around its longitudinal axis on an extension of the hinge casting 70. The hinge casting 70 is in turn rotatably mounted by the hinge bearings indicated generally at 72 on the forked frame casting 73.

The particular hinge bearing utilized for this purpose at this point constitutes the essence of the present invention and will be discussed in detail below.

The frame casting 73 has a horizontal section 74 secured in any suitable manner as by the bolts 75 to the top of insulator 16.

The sides 76 extend back to the solid portion 77 which is provided with an opening 78 appropriately recessed to form a bearing for crank 40 and its shaft.

The solid portion 77 of the base casting 62 then extends beyond to form the terminal 80 to which appropriate leads may be connected.

The stationary contact 66 comprises the plurality of contact blades 90, 91 on each side biased toward each other by the spring support members 92, 93 and so arranged that when the blade 65 enters at an angle to the horizontal position during the closing operation it will clear the blades 90 on each side.

These contact members are so arranged, however, that when the blade is rotated from the open to the closed position the blade 65 in turning to the horizontal position will spread the contacts 90 and 91 on each side against the tension of springs 92 and 93, creating the desired contact pressure.

The spring blades 92, 93 are current conducting and are connected in any suitable manner as by the bolts 98 to the base plate 99, which in turn is mounted in any suitable manner as by bolts 100 at the top of insulator 17.

The base 99 of stationary contact structure 66 has an extension 101 which serves as a terminal block or connecting member.

Thus, when the disconnect switch is in the closed position of Figure 1, current enters the terminal 80, passes through the frame casting 73 to the hinge bearing 72, then through the current carrying connection in the hinge bearing 72 to the hinge casting 70, from the hinge casting 70 to the contact blade 63 then through the contact 65 on the contact blade 63 to the stationary contact elements 90, 91 and then through the base 99 to the terminal extension 101.

The particular joint utilized for this mounting constitutes the essence of the present invention and will be discussed in detail below. The hinge casting 70 is in turn rotatably mounted by the hinge bearings indicated generally at 72 on the forked frame casting 73.

The frame casting 73 has a horizontal section 74 secured in any suitable manner as by the bolts 75 to the top of insulator 16.

The sides 76 extend back to the solid portion 77 which is provided with an opening 78 appropriately recessed to form a bearing for crank 40 and its shaft.

The solid portion 77 of the base casting 62 then extends beyond to form the terminal 80 to which appropriate leads may be connected.

The stationary contact 66 comprises the plurality of contact blades 90, 91 on each side biased toward each other by the spring support members 92, 93 and so arranged that when the blade 65 enters at an angle to the horizontal position during the closing operation it will clear the blades 90 on each side.

These contact members are so arranged however, that when the blade is rotated from the open to the closed position the blade 65 in turning to the horizontal position will spread the contacts 90 and 91 on each side against the tension of springs 92 and 93, creating the desired contact pressure.

The spring blades 92, 93 are current conducting and are connected in any suitable manner as by the bolts 98 to the base plate 99, which in turn is mounted in any suitable manner as by bolts 100 at the top of insulator 17.

The base 99 of stationary contact structure 66 has an extension 101 which serves as a terminal block or connecting member.

Thus, when the disconnect switch is in the closed position of Figure 1, current enters the terminal 80, passes through the frame casting 73 to the hinge bearing 72, then through the current carrying connection in the hinge bearing 72 to the hinge casting 70, from the hinge casting 70 to the contact blade 63, then through the contact 65 on the contact blade 63 to the stationary contact elements 90, 91 and then through the base 99 to the terminal extension 101.

Figure 2:
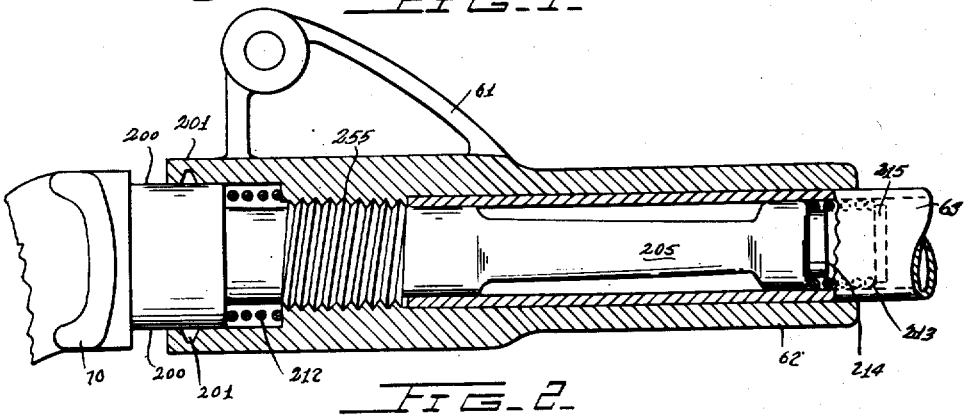
Figure 2 is a cross-sectional view of the hinge casting and switch blade of this invention showing the conducting joint and the compression spring.

The conducting joint which constitutes the current carrying connection between the hinge casting 70 and the blade 63 is shown specifically in the cross-sectional view of Figure 2. Modifications of this joint are shown in cross-section in Figures 3, 4, 5a, and 5b.

Referring first to Figure 2, the blade section 63 is a tubular metallic member which is extended back inside sleeve 62 which carries the blade crank 61. Sleeve 62 is rotatably mounted on cylindrical extension 205 of the hinge casting 70 by the rotatable interengagement of nut 255 of blade 63 with threaded part 206 of extension 205 of the hinge casting 70 as hereinafter described.

The interior of sleeve 62 is provided with an annular recess 201 at the point of engagement of the sleeve 62 with extension 200 of the hinge casting 70 to receive a weatherproofing gasket.

A heavy compression spring 212 placed between one end 211 of the cylindrical extension 205 and the nut 255 of blade 63 maintains the threads 255 of blade 63 in close continuously engaged current carrying engagement on one side with the threads 206 of the cylindrical extension 205 of the hinge casting 70.

In this way the blade 63 can be rotated around its longitudinal axis while blade 63 and hinge casting 70 remain in close current carrying engagement.

Comparing this type of current carrying engagement to a well-known annular contact, four times the contact area is available where four threads are in engagement. Hence the screw contact is more efficient and can be proportioned to the current carrying duty and not limited by diameter of the parts as determined from mechanical design considerations, such as making the diameter larger, etc.

Thus the current path from stationary contact 66 to the movable contact 65 and contact blade 63 extends through threads 255 of blade 63 to the threads 206 of hinge casting 70 and then through the hinge contact 72 to the base member 73 to the opposite terminal 80.

The weatherproofing for the current carrying connection between the blade 63 and the hinge casting 70 comprises the solid sleeve 62, the weatherproofing gasket in annular recess 201 and the method of securement of the blade 63 to the sleeve 62.

To secure the blade 63 to the sleeve 62, a suitable method is used, for instance, that shown in the abovementioned patent application Ser. No. 145,389.

An alternate position of the compression spring is shown by the dotted lines in Figure 2. Here the spring 213 is placed between extension 214 of the cylindrical extension 205 of hinge casting 70 and suitable circular stops 215 secured to the blade tube. The same type of close continuously engaged current carrying engagement is, therefore, obtained.

Figure 3:
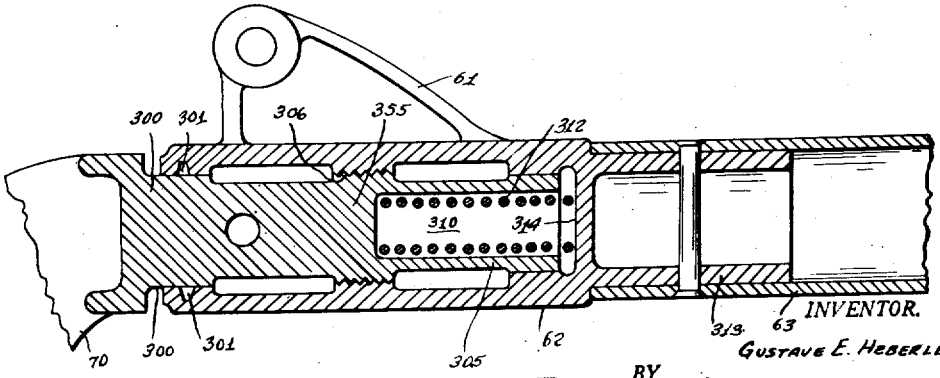
Figure 3 is a cross-sectional view of a modified version of the conducting joint of Figure 2.

A modification of the conducting joint is shown in Fig. 3.

The blade section 63 is a tubular metallic member which is secured in a suitable way to the end 313 of the blade sleeve farthest from the hinge 70. One part 355 of the sleeve 62 is internally threaded to allow it to rotate around the longitudinal axis of the blade 63. These threads 355 engage the threads 306 placed centrally on the hinge casting cylindrical extension 305.

A heavy compression spring 312 is placed in a recess 310 of the extension 305 so that it exerts pressure on end 311 of recess 310 and side 314 of blade sleeve 62. This spring maintains the threads 355 of sleeve 62 in close continuously engaged current carrying engagement on one side with the threads 306 of the cylindrical extension 305 of the hinge casting 70. That is the threads 355 and 306 are in the same type of contact as previously described with reference to Figure 2.

Thus, the current path from stationary contact 66 to the movable contact 65 and contact blade 63 extends through threads 355 of blade 63, the threads 306 of hinge casting 70 and then through the hinge contact 72 to the base member 73 and to the opposite terminal 80.

The weatherproofing for the current carrying connections is the same as that described in relation to Figure 2.

Figure 4:
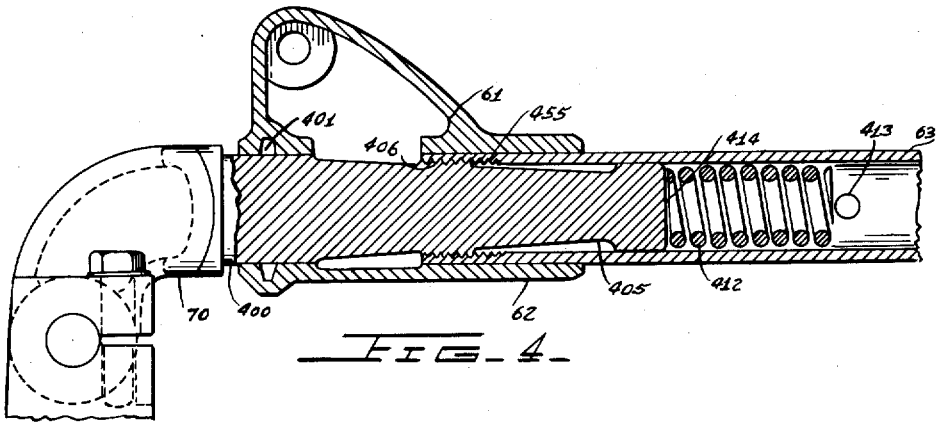
Figure 4 is a cross-sectional view of another modification of the conducting joint of Figure 2.

Another modification of the conducting joint between switch blade and hinge casting is shown in Figure 4. The switch blade 63 is extended back inside sleeve 62 which carries the blade crank 61. Sleeve 62 and blade 63, secured one to the other, for instance, as described with reference to Figure 2, are rotatably mounted on conical extension 405 of the hinge casting 70 by the rotatable interengagement of nut 455 of blade 63 with threaded part 406 of extension 405 of the hinge casting 70.

A heavy compression spring 412 placed inside the blade tube 63 between the end 414 of conical extension 405 of the hinge casting 70 and the transverse stop casting 413 maintains the threads 455 of blade 63 in close continuously engaged current carrying engagement on one side with the threads 406 of the conical extension 405 of the hinge casting 70. The threads 455 and 406 are therefore, in the same type of contact as previously described with reference to Figure 2.

The interior of sleeve 62 is provided with an annular recess 401 at the point of engagement of the sleeve 62 with extension 400 of the hinge casting 70 to receive a weatherproofing gasket.

Figure 5A:
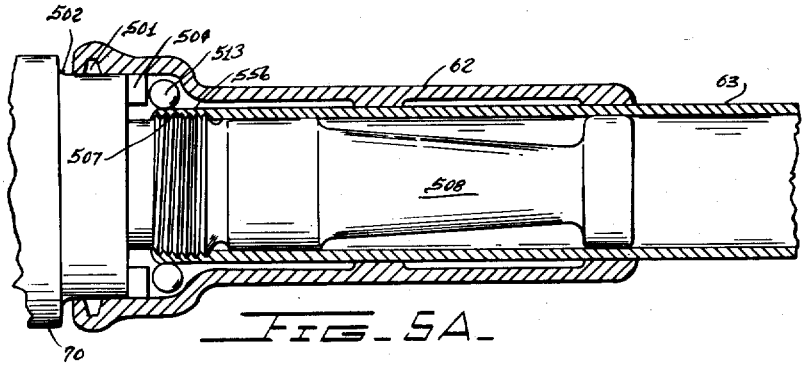
Figure 5a is a cross-sectional view of another modification of the conducting joint of Figure 2 showing a garter spring.

Another modification of the blade hinge casting conducting joint is shown in Figure 5a. The switch blade 63 is extended back into sleeve 62 and secured to it by any suitable means, for instance, that described with reference to Figure 2. Blade tube 63 is threaded at the end 555 to engage threads 506 of the extension 505 of the hinge casting 70. The sleeve 62 has an annular recess just above threads 555. A garter spring 512 placed around the blade tube 63 at point 557 maintains threads 555 of tube 63 in close continuously engaged current carrying engagement on both sides with the threads 506 of the conical extension 505 of the hinge casting 70. This type of contact is shown schematically in Figure 5c.

The current therefore, flows from stationary contact 66 to the movable contact 65 and contact blade 63, then through threads 555 of blade 63, threads 506 of hinge casting 70, hinge contact 72 to the base member 73 and to the opposite terminal 80.

The interior of sleeve 62 can be provided with another annular recess 503 at the point of engagement of the sleeve 62 with extension 500 of the hinge casting 70 to receive a weatherproofing gasket.

Figure 5B:
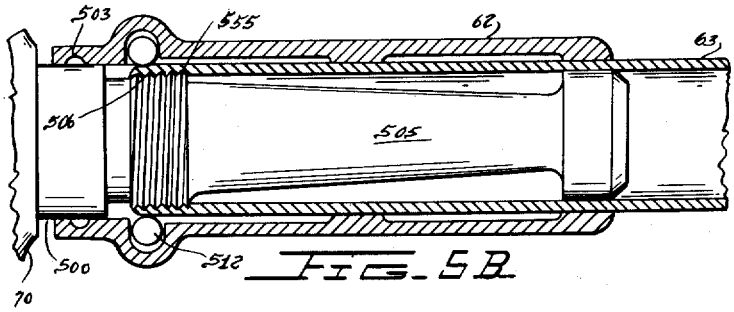
Figure 5C:
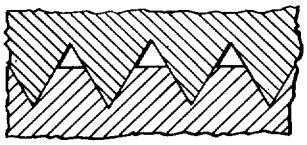
Figure 5c is a schematic cross-section showing the contact engagement achieved by the threaded hinge of Figures 5a and 5b.

A modification of the conducting joint of Figure 5a is shown in Figure 5b. Here the extension 502 of the hinge casting 70 is provided with annular casting 504 to maintain the garter spring 513 in its position during rotation of the blade 63 and its longitudinal axis. Consequently, threads 556 of blade 63 and threads 507 of hinge casting extension 508 are in the type of engagement described in connection with Figures 5c and 5a.

The blade 63 is secured to the sleeve 62 in any suitable way, for instance, that described in connection with Figure 2.

A gasket placed in the annular recess 501 of sleeve 62 weatherproofs the current carrying contact members.

In the foregoing, I have described my invention solely in connection with a specific preferred embodiment thereof. Since many variations and modifications of my invention will now be obvious to those skilled in the art, I prefer to be bound not by the specific disclosure herein contained but only by the appended claims.

I claim:

1. A switch having a frame and a movable contact arm, said contact arm being angularly movable with respect to said frame; said contact arm comprising a pivotal member having angular movement with respect to said frame and a blade mounted on said pivotal member and having rotative movement about its longitudinal axis; a current carrying connection between said frame and said pivotal member, a sleeve; said sleeve extending for at least a portion of the said current carrying joint; said sleeve being secured to said contact arm and being movable in all directions with said contact arm, said pivotal member having a threaded extension; said contact arm having a threaded member engageable with said threaded extension for mounting said contact arm on said pivotal member for rotation about said axis with respect to said pivotal member, said threaded interengagement between said contact arm and pivotal member constituting a current carrying joint therebetween.

2. A switch having a frame and a movable contact arm, said contact arm being angularly movable with respect to said frame; said contact arm comprising a pivotal member having angular movement with respect to said frame and a blade mounted on said pivotal member and having rotative movement about its longitudinal axis; a current carrying connection between said frame and said pivotal member, a sleeve; said sleeve extending for at least a portion of the said current carrying joint; said sleeve being secured to said contact arm and being movable in all directions with said contact arm, said pivotal member having a threaded extension; said contact arm having a threaded member engageable with said threaded extension for mounting said contact arm on said pivotal member for rotation about said axis with respect to said pivotal member, said threaded interengagement between said contact arm and pivotal member constituting a current carrying joint therebetween, and means biasing said threaded elements in one direction to cause a firm current carrying contact engagement between the threads.

3. A switch having a frame and a movable contact arm, said contact arm being angularly movable with respect to said frame; said contact arm comprising a pivotal member having angular movement with respect to said frame and a blade mounted on said pivotal member and having rotative movement about its longitudinal axis; a current carrying connection between said frame and said pivotal member, said pivotal member having a threaded extension; said contact arm having a threaded member engageable with said threaded extension for mounting said contact arm on said pivotal member for rotation about said axis with respect to said pivotal member, said threaded interengagement between said contact arm and pivotal member constituting a current carrying joint therebetween, and means biasing said threaded elements in one direction to cause a firm current carrying contact engagement between the threads.

4. A switch having a frame and a movable contact arm, said contact arm being angularly movable with respect to said frame; said contact arm comprising a pivotal member having angular movement with respect to said frame and a blade mounted on said pivotal member and having rotative movement about its longitudinal axis; a current carrying connection between said frame and said pivotal member, a sleeve; said sleeve extending for a least a portion of the said current carrying joint; said sleeve being secured to said contact arm and being movable in all directions with said contact arm, said pivotal member having a threaded extension; said contact arm having a threaded member engageable with said threaded extension for mounting said contact arm on said pivotal member for rotation about said axis with respect to said pivotal member, said threaded interengagement between said contact arm and pivotal member constituting a current carrying joint therebetween, and means biasing said threaded elements in one direction to cause a firm current carrying contact engagement between the threads, said contact elements being continuously engaged at all positions of said contact arm, means sealing said engaged threads within said sleeve.

5. A switch having a frame and a movable contact arm, said contact arm being angularly movable with respect to said frame; said contact arm comprising a pivotal member having angular movement with respect to said frame and a blade mounted on said pivotal member and having rotative movement about its longitudinal axis; a current carrying connection between said frame and said pivotal member, said pivotal member having a threaded extension; said contact arm having a threaded member engageable with said threaded extension for mounting said contact arm on said pivotal member for rotation about said axis with respect to said pivotal member, said threaded interengagement between said contact arm and pivotal member constituting a current carrying joint therebetween, and means biasing said threaded elements in one direction to cause a firm current carrying contact engagement between the threads, said contact elements being continuously engaged at all positions of said contact arm; means sealing said engaged threads.

6. A switch having a frame and a movable contact arm, said contact arm being angularly movable with respect to said frame; said contact arm comprising a pivotal member having angular movement with respect to said frame and a blade mounted on said pivotal member and having rotative movement about its longitudinal axis; a current carrying connection between said frame and said pivotal member, a sleeve; said sleeve extending for a least a portion of the said current carrying joint; said sleeve being secured to said contact arm and being movable in all directions with said contact arm, said pivotal member having a threaded extension; said contact arm having a threaded member engageable with said threaded extension for mounting said contact arm on said pivotal member for rotation about said axis with respect to said pivotal member, said threaded interengagement between said contact arm and pivotal member constituting a current carrying joint therebetween; means biasing said threaded elements in a longitudinal direction and effecting a close engagement between the surfaces of said threads on both sides of each thread, the surface-to-surface engagement of circular portions of said threads forming the said current carrying connection.

7. A switch having a frame and a movable contact arm, said contact arm being angularly movable with respect to said frame; said contact arm comprising a pivotal member having angular movement with respect to said frame and a blade mounted on said pivotal member and having rotative movement about its longitudinal axis; a current carrying connection between said frame and said pivotal member, a sleeve; said sleeve extending for at least a portion of the said current carrying joint; said sleeve being secured to said contact arm and being movable in all directions with said contact arm, said pivotal member having a threaded extension; said contact arm having a threaded member engageable with said threaded extension for mounting said contact arm on said pivotal member for rotation about said axis with respect to said pivotal member, said threaded interengagement between said contact arm and pivotal member constituting a current carrying joint therebetween; means biasing said threaded elements in a longitudinal direction and effecting a close engagement between the surfaces of said threads on both sides of each thread, the surface-to-surface engagement of circular portions of said threads forming the said current carrying connection, means sealing said engaged threads within said sleeve.

8. A switch having a frame and a movable contact arm, said contact arm being angularly movable with respect to said frame; said contact arm comprising a pivotal member having angular movement with respect to said frame and a blade mounted on said pivotal member and having rotative movement about its longitudinal axis; a current carrying connection between said frame and said pivotal member; said pivotal member having a threaded extension; said contact arm having a threaded member engageable with said threaded extension for mounting said contact arm on said pivotal member for rotation about said axis with respect to said pivotal member, said threaded interengagement between said contact arm and pivotal member constituting a current carrying joint therebetween; means biasing said threaded elements in a longitudinal direction and effecting a close engagement between the surfaces of said threads on both sides of each thread, the surface-to-surface engagement of circular portions of said threads forming the said current carrying connection, means sealing said engaged threads.

9. A current carrying joint comprising a substantially cylindrical extension, said extension being threaded along a portion of its length, one complementary co-axial threaded member interengaged with the threaded part of said extension, *said co-axial threaded member and said substantially cylindrical extension being constructed to have relative rotative movement,* means biasing said threaded member in one direction to cause a firm current carrying contact engagement between the threads.

10. A current carrying joint comprising a substantially cylindrical extension, said extension being threaded along a portion of its length, one complementary co-axial threaded member interengaged with the threaded part of said extension, *said co-axial threaded member and said substantially cylindrical extension being constructed to have relative rotative movement,* means biasing said threaded members in a longitudinal direction to cause a *continuous* firm current carrying contact engagement between the threads, *for all positions of said co-axial threaded member and said substantially cylindrical extension.*

11. A current carrying joint comprising an extension, said extension being threaded along a portion of its length, one complementary co-axial threaded member interengaged with the threaded part of said extension, *said co-axial threaded member and said extension being constructed to have relative movement about their axes,* means biasing said threaded member in one direction to cause a firm current carrying contact engagement between the threads.

12. A current carrying joint comprising an extension, said extension being threaded along a portion of its length, one complementary co-axial threaded member interengaged with the threaded part of said extension, *said co-axial threaded member constructed to be movable about its axis with respect to said extension,* means biasing said threaded members in a longitudinal direction to cause a *continuous* firm current carrying contact engagement between the threads, *for all positions of said member and said extension.*

References Cited in the file of this patent or the original patent

UNITED STATES PATENTS

| | | |
|---|---|---|
| 1,911,038 | Rauh | May 23, 1933 |
| 2,328,283 | Koppitz et al. | Aug. 31, 1943 |
| 2,337,711 | Crake | Dec. 28, 1943 |
| 2,359,056 | Shaw | Sept. 26, 1944 |
| 2,368,462 | Garrison | Jan. 30, 1945 |